United States Patent
Block et al.

(10) Patent No.: US 7,593,888 B2
(45) Date of Patent: Sep. 22, 2009

(54) SYSTEM AND METHOD FOR FACILITATING INVESTMENT ACCOUNT TRANSFERS

(75) Inventors: Duane James Block, Chicago, IL (US); Gail Jean Dexter, Minneapolis, MN (US); Paul Eric Krieger, Champlin, MN (US); Todd C Pingaro, Plantation, FL (US); Marcus Paul Sheire, St. Paul, MN (US); Kelly Whitaker, Minneapolis, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 259 days.

(21) Appl. No.: 11/673,266

(22) Filed: Feb. 9, 2007

(65) Prior Publication Data
US 2007/0130039 A1 Jun. 7, 2007

Related U.S. Application Data

(63) Continuation of application No. 10/125,929, filed on Apr. 19, 2002, now Pat. No. 7,222,093.

(60) Provisional application No. 60/347,492, filed on Jan. 10, 2002.

(51) Int. Cl.
*G06Q 40/00* (2006.01)
(52) U.S. Cl. .......................... 705/37; 705/38
(58) Field of Classification Search .............. 705/37–38
See application file for complete search history.

(56) References Cited

U.S. PATENT DOCUMENTS

| | | | |
|---|---|---|---|
| 4,694,397 A | 9/1987 | Grant et al. | |
| 4,774,663 A | 9/1988 | Musmanno et al. | |
| 5,101,353 A | 3/1992 | Lupien et al. | |
| 5,262,942 A | 11/1993 | Earle | |
| 5,297,031 A | 3/1994 | Gutterman et al. | |
| 5,497,317 A | 3/1996 | Hawkins et al. | |
| 5,689,651 A | 11/1997 | Lozman | |
| 5,809,483 A | 9/1998 | Broka et al. | |
| 5,852,811 A | 12/1998 | Atkins | |
| 5,913,202 A | 6/1999 | Motoyama | |
| 5,915,245 A | 6/1999 | Patterson, Jr. et al. | |
| 5,918,218 A | 6/1999 | Harris et al. | |
| 5,920,848 A | 7/1999 | Schutzer et al. | |
| 5,946,666 A | 8/1999 | Nevo et al. | |
| 5,963,923 A | 10/1999 | Garber | |

(Continued)

*Primary Examiner*—Thu Thao Havan
(74) *Attorney, Agent, or Firm*—Snell & Wilmer L.L.P.

(57) ABSTRACT

The present invention is directed toward a system and method that facilitates investment account transfers where the time standard for reliably accomplishing a transfer may be decreased. A system for facilitating investment account transfers includes an administrator, a rules engine, a service case manager, and a messaging engine. The administrator is configured to receive a transfer request and to initiate a transfer case. The administrator is also configured to cooperate with a rules engine to facilitate management of the transfer case in accordance with a set of business rules. Cooperating with the rules engine, the administrator is configured to initiate service cases comprising business process instructions which, when executed, advance the progress of the transfer case. A service case manager is configured to receive service cases from the administrator, and to perform the specific business processes specified therein. Finally, a messaging engine is configured to receive instructions from the service case manager and to transmit messages to appropriate parties at appropriate times in accordance with the specified business processes.

20 Claims, 2 Drawing Sheets

U.S. PATENT DOCUMENTS

Figure 1:
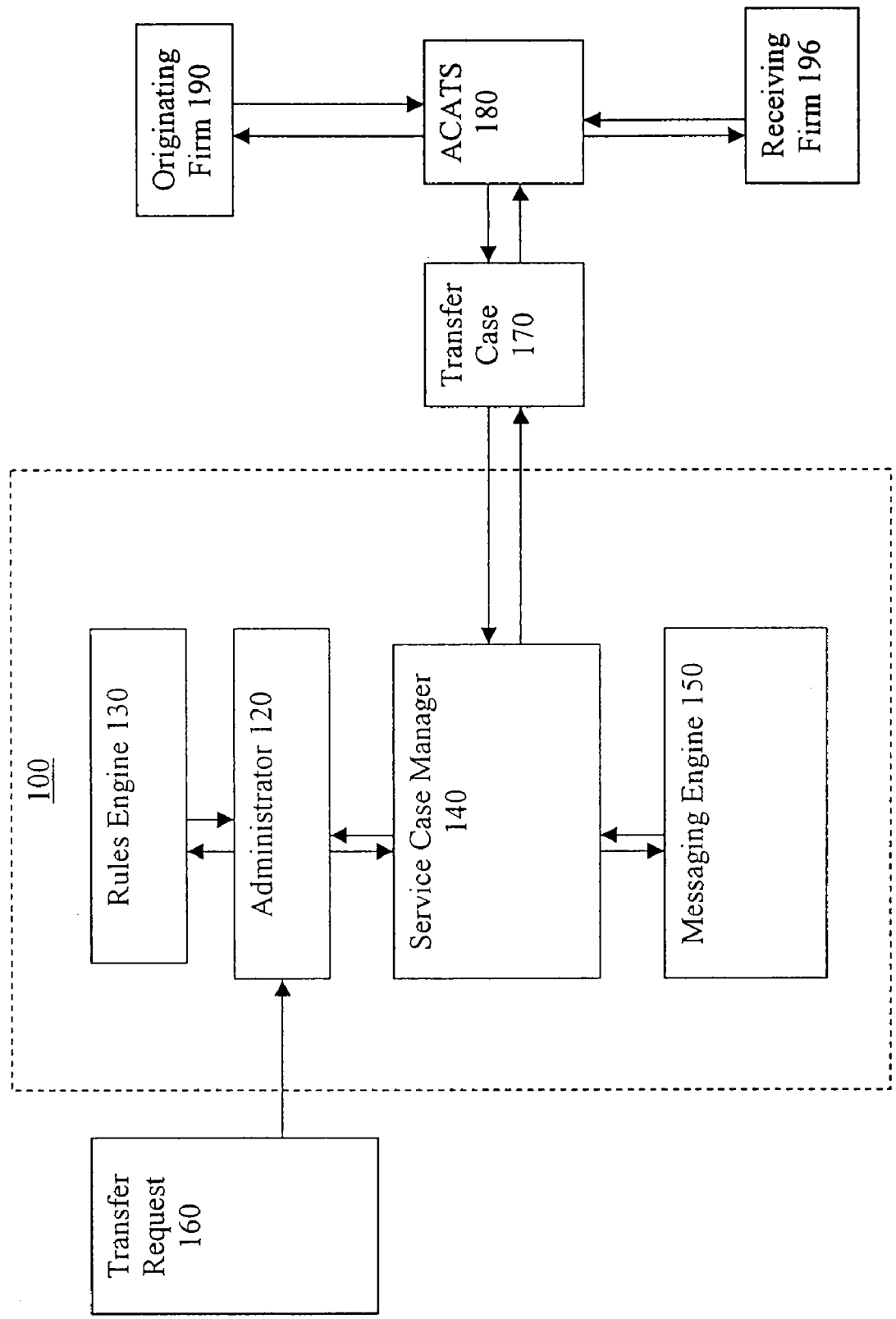

| | | | |
|---|---|---|---|
| 5,978,779 | A | 11/1999 | Stein et al. |
| 5,983,204 | A | 11/1999 | Debe |
| 5,987,440 | A | 11/1999 | O'Neil et al. |
| 6,014,643 | A | 1/2000 | Minton |
| 6,018,722 | A | 1/2000 | Ray et al. |
| 6,029,146 | A | 2/2000 | Hawkins et al. |
| 6,049,783 | A | 4/2000 | Segal et al. |
| 6,108,641 | A * | 8/2000 | Kenna et al. ................... 705/35 |
| 6,112,189 | A | 8/2000 | Rickard et al. |
| 6,144,947 | A | 11/2000 | Schwartz |
| 6,173,270 | B1 | 1/2001 | Cristofich et al. |
| 6,195,647 | B1 | 2/2001 | Martyn et al. |
| 6,202,054 | B1 | 3/2001 | Lawlor et al. |
| 6,216,115 | B1 | 4/2001 | Barrameda et al. |
| 6,233,566 | B1 | 5/2001 | Levine et al. |
| 6,247,000 | B1 | 6/2001 | Hawkins et al. |
| 6,260,025 | B1 | 7/2001 | Silverman et al. |
| 6,269,346 | B1 | 7/2001 | Cristofich et al. |
| 6,272,474 | B1 | 8/2001 | Garcia |
| 6,278,982 | B1 | 8/2001 | Korhammer et al. |
| 6,317,726 | B1 | 11/2001 | O'Shaughnessy |
| 6,317,728 | B1 | 11/2001 | Kane |
| 6,321,212 | B1 | 11/2001 | Lange |
| 6,324,523 | B1 | 11/2001 | Killeen, Jr. et al. |
| 6,820,118 | B1 * | 11/2004 | Leymann et al. ............ 709/223 |
| 2003/0212654 | A1 | 11/2003 | Harper et al. |

\* cited by examiner

SYSTEM AND METHOD FOR FACILITATING INVESTMENT ACCOUNT TRANSFERS

CROSS REFERENCE TO RELATED APPLICATIONS

This application is a continuation of U.S. patent application Ser. No. 10/125,929, entitled "SYSTEM AND METHOD FOR FACILITATING INVESTMENT ACCOUNT TRANSFERS," filed on Apr. 19, 2002, which application is a non-provisional of and claims priority to U.S. Provisional Patent Application No. 60/347,492, filed Jan. 10, 2002, which applications are incorporated herein in their entirety by reference.

FIELD OF THE INVENTION

The present invention relates generally to systems for facilitating account transfers, and more specifically, to systems and methods for facilitating transfers of investment accounts.

BACKGROUND OF INVENTION

Individual investors commonly own portfolios of financial assets such as stocks, mutual funds, bonds, certificates of deposit, foreign currencies, options, REITS, cash, or any other tradable assets. To help manage their asset portfolios, investors often employ the services of an investment firm. Often, an individual financial advisor serves to provide advice and facilitate communication between the investor and the investment firm.

Investment firms typically hold the investors' assets in investment accounts. In situations where an investor desires to change investment firms or otherwise change the entity who holds the investor's assets, it may be necessary to transfer the assets in the investment account. For example, in situations where the new investment firm does not share a common clearing broker-dealer with the original investment firm, it may be desirable and/or necessary to transfer the financial assets of the investor's portfolio from the account of the original investment firm to an account of the new investment firm.

One method for transferring assets involves first converting the financial assets at the original investment firm to an equivalent amount of cash, depositing the cash in the new investment firm, and converting the cash to back to an equivalent amount of the assets to be held by the new investment firm. Unfortunately, however, this method requires multiple transactions to be completed, each incurring transaction expenses, exposing the investor to market risk, and often triggering tax consequences.

To avoid these pitfalls, various methods have been developed to affect who holds the financial assets without requiring their conversion to an intermediate transferable medium, such as cash. For example, where securities are held as book entry, a transfer may be accomplished by modifying the holders' books and records. To further streamline the transfer process, investment firms have developed and standardized procedures to accommodate transfers of most common types of financial assets. For example, major investment firms have established the Automated Client Account Transfer System, i.e., ACATS, which is an electronic network system configured to facilitate transfers of financial assets.

Although investment account transfers are typically accomplished according to standardized procedures, the standard investment account transfer process can be complex and time consuming. Both the procedures that are used and the time that is required to complete a transfer depend upon whether the transfer may be accomplished through an established electronic network system such as ACATS. Even where an investment account transfer may be accomplished using ACATS, however, delays may be experienced due to manual process steps that may be entailed. Moreover, in cases where an investment account transfer may not be accomplished using any established electronic network system, such as where the assets to be transferred may include checks, wire transfers, certificates of deposit, or cash, the established time standard may be much longer. Further, in the case of direct rollovers, some transfers may require a longer time standard. Accordingly, many would want the current time standards to be shortened.

Some of the causes of these unreasonably long time standards are the necessity for manual evaluation, processing, and monitoring involved in many of the steps in the transfer processes. For example, despite a high degree of automation, the ACATS transfer process still requires employees to manually evaluate the assets being transferred, to manually submit investment account transfer requests, and to manually monitor the status of asset transfers. These manual process steps are time consuming and may result in errors, causing process steps to be repeated. Similarly, where an investment account transfer may not be accomplished using an established electronic network system, the processes may be even more manually intensive and may be dependent upon cooperation between the investment firm from which the assets are to be transferred, i.e., the delivering firm, and the firm to which the assets are to be transferred, i.e., the receiving firm. As a result, the process may depend upon the timeliness, accuracy, and cooperation of competing entities and often requires excessive monitoring and repeated process steps. Typically, where the transfer process is unable to rely upon an established electronic network system, manual review of assets and manual decisioning based on industry and specific business rules of individual Broker-Dealers must be performed. Historically, another significant source of dissatisfaction with investment account transfers stems from the common failure to notify appropriate parties when key process steps have been completed or when necessary information is needed.

Accordingly, it would be advantageous to have a system and method for facilitating investment account transfers where the time standard for reliably accomplishing a transfer could be reliably decreased. It would also be advantageous if the system and method for facilitating investment account transfers were more consistent, reliable and automated while decreasing requirements for manual processing. Further, it would be advantageous to have a financial account transfer system that could be configured to facilitate both monitoring and execution of the transfer process with appropriate decision-making and messaging capabilities.

SUMMARY OF INVENTION

The present invention is directed toward a system and method for facilitating investment account transfers. In particular, the invention is directed toward a system and method that facilitates investment account transfers where the time standard for reliably accomplishing a transfer may be decreased dramatically. A system for facilitating investment account transfers includes an administrator, a rules engine, a service case manager, and a messaging engine.

The administrator is configured to receive a transfer request and to initiate a transfer case. The administrator is also configured to cooperate with a rules engine to facilitate management of the transfer case in accordance with a set of business rules. Cooperating with the rules engine, the administrator is configured to initiate service cases comprising business process instructions which, when executed, advance the progress of the transfer case. A service case manager is configured to receive service cases from the administrator, and to perform the specific business processes specified therein. Finally, a messaging engine is configured to receive instructions from the service case manager and to transmit messages to appropriate parties at appropriate times in accordance with the specified business processes.

An exemplary set of business rules may require the submission of a required set of parameters regarding an individual investment account or asset or may require a specific set of criteria to be satisfied before initiating or completing a process step.

An exemplary business process that may be initiated in accordance with a business rule may include the sending of a message indicating that insufficient information was received, such as where the required set of parameters was not submitted, or the transmittal of an appropriate message when a transfer has been completed.

BRIEF DESCRIPTION OF EXEMPLARY DRAWINGS

Figure 2:
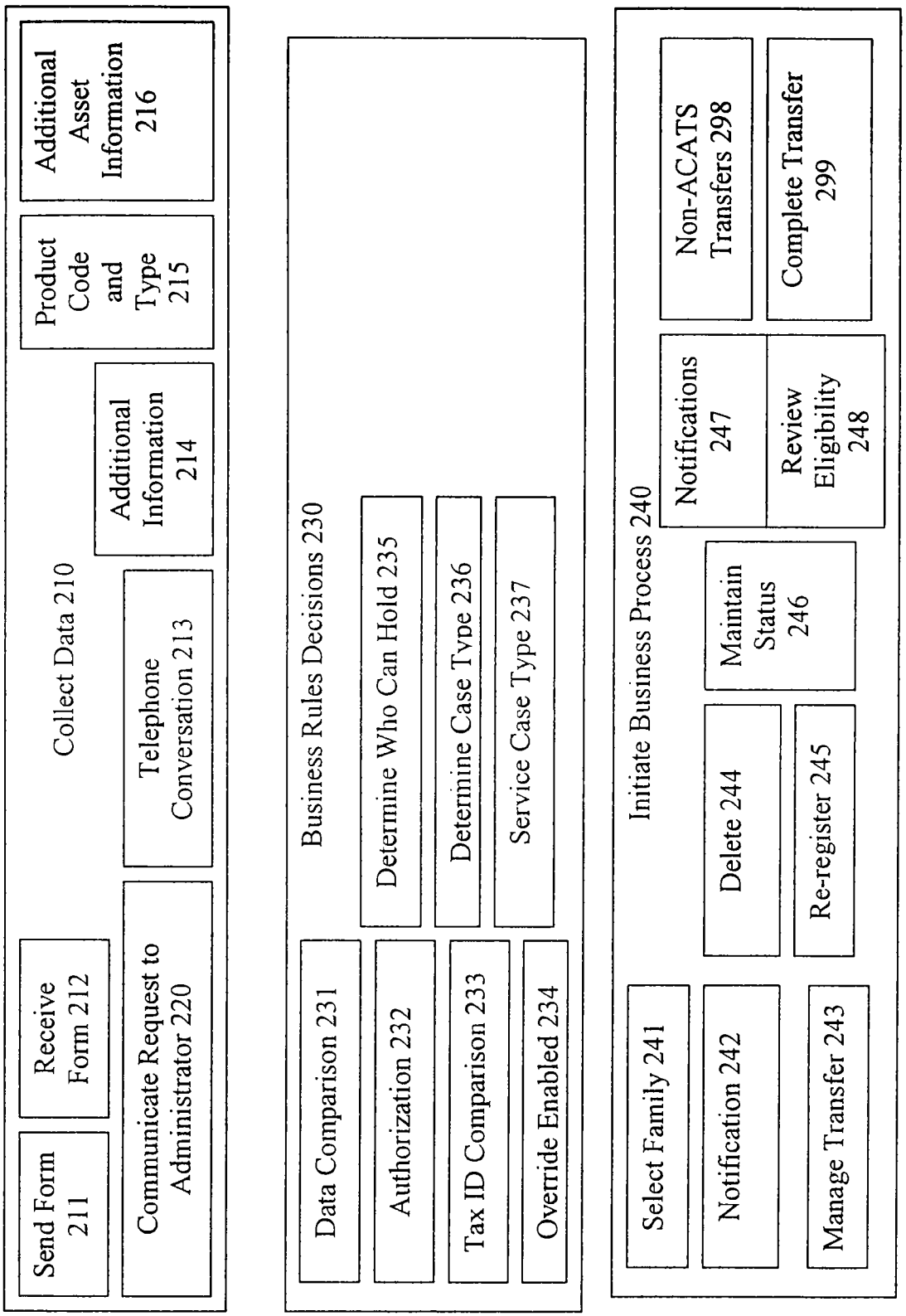

The above-mentioned objects and features of the present invention can be more clearly understood from the following detailed description considered in conjunction with the following drawings, in which like numerals represent like elements and in which:

FIG. 1 illustrates the interactions of an exemplary system configured to facilitate an investment account transfer process; and, FIG. 2 illustrates an exemplary process for facilitating an investment account transfer process.

DETAILED DESCRIPTION OF EXEMPLARY EMBODIMENTS

The present invention is an investment account transfer system configured to facilitate the transfer of an investment account from a delivering firm to a receiving firm. The system facilitates automatic decisioning, monitoring, and execution of processes required to complete such investment account transfers. In accordance with one aspect of the invention, a system for facilitating investment account transfers includes an administrator, a rules engine, a service case manager, and a messaging engine.

The administrator is configured to facilitate receipt of a transfer request and initiation of a transfer case. The administrator is also configured to facilitate cooperation with a rules engine to facilitate management of the transfer case in accordance with a set of business rules implemented on the rules engine. Cooperating with the rules engine, and based on decisions made by the rules engine, the administrator is configured to initiate service cases comprising business process instructions which, when executed, advance the progress of the transfer case. A service case manager is configured to receive a service case from the administrator, and to facilitate execution of the instructions contained in the service case, thereby accomplishing the specific business processes specified in the service case. Finally, a messaging engine is configured to facilitate receiving instructions from the service case manager and to facilitate transmitting messages to appropriate parties at appropriate times in accordance with specified business processes.

In an exemplary embodiment, a set of business rules requires the collection of a required set of parameters regarding an individual investment account. Another exemplary set of business rules requires the satisfaction of a specific set of criteria before allowing the initiation or completion of a process step. An exemplary business process that may be initiated in accordance with a business rule includes the sending of a message indicating that insufficient information was received where the required set of parameters was not submitted. Another exemplary business process includes the transmittal of an appropriate message when an investment account transfer has been completed.

In accordance with a further aspect of the present invention, a method of facilitating the transfer of an investment account from a delivering firm to a receiving firm is also provided. In accordance with the invention, data is collected from sources including the delivering firm, the receiving firm, and an external system such as ACATS or another established electronic network system. When the information has been collected, it is communicated to the administrator, which cooperates with the rules engine to make one or more decisions based on a predefined set of business rules, and to initiate one or more business process. The business process may include sending messages, acquiring additional information, or making an additional deterninination. At least one of the business processes includes initiating the investment account transfer.

The data to be collected and communicated to the administrator may include data identifying the firm from which the investment account is to be transferred, i.e., the delivering firm. That identification data may include data to identify the client such as the client's name, address, social security number, beneficiaries, birth date and the like. The identification data may also identify the delivering investment account, e.g., by name and social security number, as well as the delivering Broker-Dealer, e.g., by a participant number that may be assigned by industry standard relationships.

Further, the data to be collected and communicated to the administrator may include the delivering account number and an account type describing the specific client investment account at the delivering firm. The account type may represent the form of account ownership such as individual, joint, trust, partnership, or corporation. The account type may also indicate other information specifying account attributes such as fee basis, account minimums, discretionary trading, or what kind of financial products the account may hold. These account attributes may also reflect the type of brokerage account, such as an investment account, an advisor-managed wrap account, individual retirement account, or client-managed wrap account. The account may be held at a financial institution such as a bank, a broker, a clearing agent, or any type of firm that holds investment accounts. Finally, data may be collected identifying specific assets to be transferred and indicating whether the transfer is to be a full or partial transfer.

In an exemplary embodiment, data from the delivering firm and from the external source may be collected by an associate. An associate may be a person, a machine, a computer, software and/or hardware, and may collect the information through a telephone conversation, facsimile, scanner, character recognition software, from an electronic database, or from forms received from an investor or a representative of an investor. In an exemplary embodiment, the associate may collect data from a record database for comparison to, and verification of, data collected from external sources. In these situations, the record data source may be maintained for such comparison and verification purposes, and the data from the external sources may be compared to the data of record from the record data source. In the event that the information entered by an associate is incomplete, the associate may collect the missing information from any one of a variety of databases. The associate may collect data from the receiving investment firm's internal system, from the delivering investment firm, or from an external source such as ACATS.

With reference to FIG. 1, an exemplary system 100 for facilitating investment account transfers includes an administrator 120 in communication with a rules engine 130, a service case manager 140, and a messaging engine 150. The administrator 120 is configured to receive a transfer request 160 and to initiate a transfer case 170. The administrator 120 is also configured to cooperate with a rules engine 130. Cooperating with the rules engine, the administrator 120 is configured to initiate a service case comprising one or more business process instructions which, when executed, advances the progress of the transfer case.

A service case manager 140 is configured to facilitate management of the transfer case 170 in accordance with the business rules. Service case manager 140 is configured to receive messages from the administrator 120, to create additional service cases when necessary, and to perform the specific business processes specified in service cases. Finally, a messaging engine 150 is configured to receive instructions from the administrator and the service case manager and to transmit messages to appropriate parties at appropriate times in accordance with specified business processes.

The administrator 120 is configured to facilitate distribution of service cases, i.e., process steps or tasks, helpful in facilitating, monitoring and executing the investment account transfer process. Once the information has been collected and communicated to the administrator 120, the administrator 120 proceeds to facilitate the completion of the transfer case 170. Cooperating with the rules engine 130, and based on decisions made by the rules engine 130, the administrator 120 may initiate one or more service cases, each comprising business process instructions which, when executed, advance the progress of the transfer case 170. In this way, the administrator 120 distributes the process tasks among one or more service cases, which may specialize in a type of service case such as sending a message, accessing a database, or making a decision.

Accordingly, the administrator 120 is configured to initiate a series of automated actions in response to the occurrence of one or more predetermined event, the satisfaction of a business rule, and/or a decision made by the rules engine 130. For example, in the event that insufficient information has been collected to complete the transfer, the rules engine 130 may recognize the deficiency, and the administrator 120 may respond by initiating a service case configured to execute a remedial procedure such as requesting or otherwise collecting the missing information. Typically, the first action initiated by the administrator 120 is to request that the rules engine 130 evaluate the data that was collected and determine what type of transfer is desired. In this way, the rules engine 130 may immediately recognize whether or not a necessary piece of information is missing or whether an asset to be transferred is ineligible for transfer, and if necessary, the administrator 120 may initiate one or more remedial processes sufficiently in advance to prevent unnecessary delay of the transfer.

The system 100 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computers will typically include an operating system (e.g., Windows NT, 95/98/2000, Linux, Solaris, etc.) as well as various conventional support software and drivers typically associated with computers. User computers can be in a home or business environment with access to a network. In an exemplary embodiment, access is through the Internet through a commercially-available web-browser software package.

Communication between the parties to the transfer and the system 100 may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computers may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, a computer of the receiving firm 196 may employ a modem to occasionally connect to the internet, whereas the administrator 120 computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997).

The system 100 may be suitably coupled to network via data links. A variety of conventional communications media and protocols may be used for data links. Such as, for example, a connection to an Internet Service Provider (ISP)

over the local loop as is typically used in connection with standard modem communication, cable modem, Dish networks, ISDN, Digital Subscriber Line (DSL), or various wireless communication methods. The system 100 might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

In accordance with an exemplary embodiment, the rules engine 130 may be configured to perform one or more decision-making processes. Exemplary decisions are configured to eliminate manual processing steps in the transfer process and include, for example, determining whether the tax identification numbers and the account types of the delivering and receiving accounts match, determining whether a request is a liquidation request, determining whether the client's data from the receiving firm 196 matches the data acquired from the delivering firm 190, determining whether a letter of authorization has been acquired authorizing the transfer between the non-matching client accounts, or any other decision necessitated by a financial account transfer process. Other exemplary decisions include determining whether the product types match based upon a predetermined set of match criteria defined in the rules engine. To accommodate situations where all match criteria may not be satisfied but where it is nevertheless desirable to allow the transfer to proceed, the rules engine 130 may be configured to accommodate a manual, conditional, or automatic override and to determine whether that override has been enabled and how it has been configured. The rules engine 130 may also be configured to accommodate the addition of new rules and/or the modification of existing rules, thereby facilitating the reconfiguration of the rules as business needs change. The rules engine 130 may be implemented as a discrete module or may be distributed within or across the other components of the system 100 such that the functions of the rules engine 130 are distributed among, i.e., implemented within, the other elements of the system 100.

Upon initiation of a service case, the administrator 120 assigns and communicates the service case for execution by one or more service case managers 140. As described above, each service case comprises business process instructions which, when executed, advance the progress of the transfer. Exemplary service cases may comprise the business processes of requiring the addition of notes to a service case file or the sending of an electronic message notification. Other exemplary business processes that may be initiated by the administrator 120 based on data and the rules include placing a hold on a service case due to insufficient information. If, for example, the rules require a social security number, and if the social security number has not been collected, the administrator 120 may initiate a business process to create a service case configured to generate a notification, such as an electronic message, requesting the additional information.

A service case may also be created to monitor the progress of a service case, such as requesting and/or collecting additional information. Exemplary business processes may also include submitting a transfer request to ACATS 180, initiating a service case to track the progress of an ACATS transfer, or initiating a service case to process a non-ACAT transfer.

It should be noted that the processing of a non-ACAT transfer may involve many sub-processes such as sending forms to the delivering firm 190. Accordingly, additional service cases may be initiated comprising processes tailored for transferring specific assets. For example, some mutual funds must be cleared through a specific broker in order to be transferred. Accordingly, the administrator 120 may be configured to recognize the asset type and initiate an appropriate service case based on that asset type. Asset type may be determined based on various indicia such as ticker symbol or QUSIP, which are unique to the asset. Once the asset type has been determined, additional information regarding that asset type may be acquired from the product system. That may also be communicated to the rules engine 130, which may generate additional decisions or necessitate additional service cases.

In an exemplary embodiment, a messaging engine 150 is configured to receive and execute a request to send a message. The messaging engine 150 may comprise enterprise messaging middleware, such as MQ messaging from IBM, or may comprise any other software suitable for sending messages. An exemplary message may comprise a request for additional information, or a confirmation that the data was received. Messaging engine 150 may be configured to maintain the security and/or confidentiality of transmitted information through means such as encryption, application of appropriate legends, e.g., proprietary legends, and use of secure transmission means.

As described above, a service case is generated for every piece of business that the administrator 120 receives. The service case may enable the monitoring of the piece of business, including aspects such as who is assigned a task relating to the piece of business. For example, a service case manager 140 may be instructed to monitor the business process of requesting and collecting certain necessary information.

In an exemplary embodiment, a remote protocol may be used to collect data. In accordance with the embodiment, a remote protocol is configured to acquire a predetermined set of data. For example, a remote protocol may be configured to retrieve an account registration, an account type, and/or a product type. Standard remote protocols may be configured to accomplish common or repetitive information requests.

In addition, a product data system maintains information relating to investment accounts such as asset identities, balances, recent trades, dividends, and/or any other information related to an investment account. Product data system, as well as other databases used in conjunction with the invention, may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Finally, a document imager may be configured to image any document that is received. Document imager may also be configured to store the images in a database for a predetermined amount of time in accordance with document retention guidelines that may be established to aid in the resolution of disputes and/or to comply with government, industry and company regulations, standards and/or customs.

With reference to FIG. 2, in accordance with a further aspect of the present invention, a method of facilitating the transfer of an investment account from an delivering 190 to a receiving firm 196 (method 200) is also provided. In accordance with the invention, data is collected from sources including the delivering firm 190, the receiving firm 196, and an external system such as ACATS 180 (step 210). When the has been collected, it is communicated to the administrator 120 (step 220), which cooperates with the rules engine 130 to perform one or more business rules decisions (step 230), and to initiate one or more business process (step 240). The business processes depend upon the decisions made by the rules engine 130 and may include sending messages, acquiring additional information, or making additional determinations. At least one of the business processes includes completing the investment account transfer (step 299).

The step of collecting data from the delivering firm 190 (step 210) may comprise the steps of providing the delivering firm 190 with a form having a series of blanks (step 211) and automatically receiving a completed form from the delivering firm 190 (step 212). Alternatively, the step of collecting data from the delivering firm 190 (step 210) could comprise the steps of gathering the information during a telephone conversation with a representative of the delivering firm 190 or directly from the investor or a representative of the investor (step 213).

Once the data has been collected and communicated to the administrator 120, the rules engine 130 compares the client's data from the destination firm to the data acquired from the delivering firm 190 and determines whether the data matches or substantially correlates based on a predetermined requirement (step 231). If the data does not match, the administrator 120 determines whether a letter of authorization has been acquired authorizing the transfer between the non-matching client accounts (step 232). In addition, the rules engine 130 may compare the tax identification number of the delivering firm 190 to the number received from the client (step 233). If the numbers do not match, the administrator 120 may also determine whether an override has been enabled (step 234).

It should be noted that ACATS 180 is an external industry system that investment firms use to transfer assets. Accordingly, ACATS 180 may provide details of an investment account and the individual assets within that account. Therefore, for transfers that may use ACATS 180, it may not be necessary for the system to identify each of the assets. For non-ACAT transfers, however, each of the assets in an investment account must be identified. The identification may include the QUSIP or the ticker symbol of the asset. The administrator 120 may use the identification data to access additional data from the product system to determine the type of each asset, e.g., stock, bond, mutual fund, etc. Accordingly, the administrator 120 may issue a message seeking retrieval of additional information from the product system (step 214). The sought reply would describe each of the assets. For example, if the account includes mutual funds, the administrator 120 may issue a message requesting that a service case manager 140 to collect data including a product code and type (step 215) so that the rules engine 130 may determine which type of products may hold the mutual fund (step 235).

In accordance with an exemplary embodiment, the rules engine 130 determines the type of the service case (step 236). Exemplary service case types include incomplete service cases, ACAT service cases, non-ACAT service cases, and mutual fund service cases. If the service case is an ACAT transfer case 170, the administrator 120 may issue a message instructing that a full transfer of asset be accomplished (step 299). If the case is a non-ACAT transfer case 170, however, the administrator 120 will instruct the messaging engine 150 to request additional information regarding each individual asset (step 216). Once that information has been collected, the rules engine 130 determines whether each of the assets are eligible to be accepted by the receiving account and determines what type of service case to establish (step 237). Finally, the administrator 120 issues appropriate service cases configured to accomplish the transfer of those assets (step 298).

In accordance with another exemplary embodiment, the administrator 120 selects a firm or fund family based on the information that was collected (step 241). Based on that firm or fund family, the rules engine 130 compares the account identifiers, e.g., client registration names, associated with the delivering account and the destination account (step 238). If additional notes need to be added to the service case, the administrator 120 prompts the messaging engine 150 to add the additional notes to the electronic message and to dispatch the electronic message to the investor or the representative of the investor (step 242). Finally, the administrator 120 initiates a service case to manage the transfer (step 243).

If the transfer is ACATS eligible, the system, upon receipt of assets data from the delivering firm 190, automatically evaluates the assets and determines if the investment firm can hold them (step 239). If assets are found that cannot be held at the group or within a specific product at the group, the invention will automatically submit the appropriate instructions to existing systems to "line item delete" the individual Mutual Funds that cannot be held (step 244). In addition, the invention will automatically submit the appropriate instructions to existing systems to "re-register" Mutual Funds if the transfer is being processed through ACATS 180 (step 245). Once assets have been received, the invention, based on input from existing reports, automatically updates the service cases that maintain the status of the transfer request (step 246). If no problems are encountered in the process that require manual intervention, the invention allows an ACATS transfer to be completely automated after the initial entry of the transfer data.

Upon the passage of predefined milestones during the investment account transfer process, the administrator 120 may also issue messages instructing the messaging engine 150 to provide automated investor notifications (step 247). The administrator 120 may also issue service cases including submission of a transfer request and the review of asset eligibility upon receipt of asset data (step 248).

Accordingly, the invention improves the processes of collecting data, and, based on a pre-defined and user maintainable set of business rules, automatically determines the appropriate courses of action and workflows based on the collected data. The outcome of the automated decisioning of the rules engine 130 is to automatically create service cases, generate electronic messages and/or submit the transfer request to ACATS 180. In the case of non-ACATS transfers, information about the delivering firm 190 and the assets being transferred are processed to automatically determine what service cases to create and processes to follow in order to complete the transfer process.

The present invention may be described herein in terms of functional block components, screen shots, optional selections and various processing steps. It should be appreciated that such functional blocks may be realized by any number of hardware and/or software components configured to the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or over any network having similar functionality described herein.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become pronounced are not to be construed as critical, required, or essential features or any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. An improved system for transferring an investment account comprising:
    a memory for storing a plurality of computer programs comprising an application program, a business process instruction manager, an administrator and a rules engine;
    a processor coupled to said memory for executing said plurality of computer programs;
    said application program configured to interface with said administrator and said rules engine;
    said administrator configured to receive an identification of a first asset, wherein said investment account comprises a first financial asset;
    said administrator configured to initiate a transfer case comprising transfer instructions, wherein said transfer case facilitates transferring management of said investment account from a first entity to a second entity;
    said rules engine configured to determine a transfer type;
    said administrator configured to cooperate with said rules engine to initiate a business process instruction to advance said transfer case, wherein said business process instruction is configured in accordance with said transfer type;
    said administrator configured to communicate said business process instruction to said business process instruction manager;
    said business process instruction manager configured to facilitate management of said transfer case in accordance with a business rule of said rules engine, wherein said rules engine is configured to determine a correlation between said transfer instructions and a pre-determined threshold; and,
    said administrator configured to initiate an additional business process instruction when said rules engine determines that said correlation between said transfer instructions is below said pre-determined threshold.

2. The system of claim 1, wherein said transfer instructions comprise delivering data, receiving data, and external data.

3. The system of claim 1, wherein said identification of said first asset is received from at least one of Automated Client Account Transfer System (ACATS) and a product system.

4. The system of claim 1, wherein said transfer type comprises at least one of Automated Client Account Transfer System (ACATS), non-ACATS, and mutual fund.

5. The system of claim 1, wherein said business rules are configured to be modified by a user.

6. The system of claim 1, wherein said processing instructions are configured to determine eligibility of an asset for receipt by a receiving firm.

7. The system of claim 1, wherein said improved system is in communication with an automated account transfer system, said processing instructions configured to communicate said transfer request to said automated account transfer system.

8. The system of claim 1, said application program configured to interface with a messaging engine, said messaging engine configured to receive instructions from said service case manager and to transmit a message.

9. The system of claim 8, wherein said messaging engine is configured to notify a representative of an investor upon an occurrence of a predetermined event during at least one of analysis of said transfer request and execution of said processing instructions.

10. The system of claim 8, wherein said messaging engine is configured to notify an investor upon an occurrence of a predetermined event during at least one of analysis of said transfer request and execution of said processing instructions.

11. The system of claim 1, wherein said application program further comprises a service case manager for a service case.

12. An improved method for computerized transfer of an investment account comprising:
    receiving, using an account management computer, an identification of a first asset, wherein said investment account comprises said first asset;
    initiating, using said account management computer, a transfer case comprising transfer instructions, wherein said transfer case facilitates transferring management of said investment account from a first entity to a second entity;
    initiating, using said account management computer, a business process instruction to advance said transfer case, wherein said business process instruction is configured in accordance with a transfer type;
    performing, using said account management computer, said business process instruction based on said transfer instructions;
    performing, using said account management computer, said business process instruction in conjunction with a business rule to create a transfer request, said business process instruction producing an automated response in accordance with values of said transfer instructions;
    determining, using said account management computer, a correlation between said transfer instructions to a pre-determined threshold; and,
    initiating, using said account management computer, an additional business process when a rules engine determines that said correlation between said transfer instructions is below said pre-determined threshold.

13. The method of claim 12, wherein said transfer instructions comprise delivering data, receiving data, and external data.

14. The method of claim 12, further comprising collecting transfer instructions, wherein said transfer instructions comprise delivering data, receiving data, said external data, and wherein said delivering data is collected from a delivering firm, said external data is collected from an external source, and said receiving data is collected from a receiving firm.

15. The method of claim 12, wherein said transfer type comprises at least one of Automated Client Account Transfer System (ACATS), non-ACATS, and a mutual fund.

16. The method of claim 12, wherein said step of producing an automated response comprises communicating said transfer request to an automated account transfer system.

17. The method of claim 12, wherein said step of producing an automated response comprises determining eligibility of an asset for receipt by said receiving firm.

18. The method of claim 12, wherein said step of initiating a business process comprises initiating a service case which comprises a business process.

19. The method of claim 12, wherein said step of initiating a business process comprises initiating a service case which comprises a business process, and further comprising determining a transfer type of said service case.

20. The method of claim 12, wherein receiving said identification of said first asset comprises receiving said identification from at least one of Automated Client Account Transfer System (ACATS) and a product system.

* * * * *